United States Patent [19]

Gebhard et al.

[11] Patent Number: 5,779,586

[45] Date of Patent: Jul. 14, 1998

[54] DRIVING DEVICE

[75] Inventors: Wolfgang Gebhard; Eduard Heilig. both of Friedrichshafen, Germany

[73] Assignee: ZF Friedrichshafen AG, Friedrichshafen, Germany

[21] Appl. No.: 704,503

[22] PCT Filed: Mar. 7, 1995

[86] PCT No.: PCT/EP95/00835

§ 371 Date: Sep. 11, 1996

§ 102(e) Date: Sep. 11, 1996

[87] PCT Pub. No.: WO95/25021

PCT Pub. Date: Sep. 21, 1995

[30]  Foreign Application Priority Data

Mar. 12, 1994  [DE]  Germany .................. 44 08 472.20

[51] Int. Cl.[6] .................................................. B60K 23/02
[52] U.S. Cl. .................. 475/140; 475/141; 475/127; 192/87.13
[58] Field of Search .................. 475/140, 141, 475/127, 271, 311, 317, 321; 192/87.13, 4 A

[56]  References Cited

U.S. PATENT DOCUMENTS 4,195,716  4/1980  Wirt .
4,257,505  3/1981  Stodt ..................... 192/87.13 X
4,377,094  3/1983  Thompson et al. .................. 475/127 X
5,151,068  9/1992  Mann et al. ..................... 475/141 X
5,152,725  10/1992  Shank, Jr. ....................... 475/311 X
5,306,215  4/1994  Mann et al. ..................... 475/141 X
5,407,042  4/1995  Fukui et al. ..................... 192/87.13 X
5,478,290  12/1995  Buuck et al. ........................ 475/140
5,509,860  4/1996  Legner ............................ 475/140 X

FOREIGN PATENT DOCUMENTS 0 090 945  10/1983  European Pat. Off. .
32 37 723  4/1984  Germany .
43 05 763  10/1993  Germany .

*Primary Examiner*—Rodney H. Bonck
*Assistant Examiner*—Peter T. Kwon
*Attorney, Agent, or Firm*—Davis and Bujold

[57]  ABSTRACT

A driving device, in particular for driving the wheels of a motor vehicle, is provided with a drive and a mechanical gear downstream thereof and two hydraulically shiftable friction clutches (3) or friction brakes (4) for connecting the drive with the gear and for carrying out the functions of a parking brake. The friction clutches (3) or friction brakes (4) are connected, by control pressure lines (27, 28), with auxiliary pistons (15, 16) cooperating therewith, and when the accumulator piston (7) is actuated by the gearshift pistons (15, 16), the volume of the accumulator piston (7) is supplied by the control pressure lines (27, 28) to the gearshift pistons (15, 16) in order to uncouple them.

11 Claims, 2 Drawing Sheets

DRIVING DEVICE

The invention relates to a driving device, in particular for driving the wheels of a motor vehicle, having a drive and a mechanical gear connected downstream thereof and two hydraulically shiftable friction clutches or friction brakes by which the drive may be connected with the gear and which carry out the function of a parking brake.

BACKGROUND OF THE INVENTION

In relation to powershift transmissions, such as used in industrial vehicles like wheel excavators and loaders, it is known to provide an auxiliary uncoupling device by which the power train of the industrial vehicle may be interrupted thus making it possible to tow away a horizontally lying vehicle.

DE 43 05 763 has disclosed a driving device with a hydromotor and a mechanical gear connected downstream thereof which has a mechanically actuated auxiliary uncoupling device. In the driving device disclosed in said publication, the friction clutch can be locked in the open position by a mechanical device for the towing operation so that the vehicle can be towed without problem.

However, it is a disadvantage that the uncoupling of the power train is carried out mechanically wherefore this solution is very complicated and thus expensive in view of the multiplicity of separate parts needed.

SUMMARY OF THE INVENTION

Therefore, this invention is based on the problem of providing a driving device with which a vehicle lying in horizontal state can be towed without problem and which is of reasonable cost.

According to the invention, this problem is solved by connecting the friction clutches or friction brakes, via control pressure lines, with an auxiliary uncoupling device which has an adjustable accumulator piston and gearshift pistons cooperating therewith, wherein when the accumulator piston is actuated by the gearshift pistons, the volume of the accumulator piston can be supplied through the control pressure lines to the friction clutches for uncoupling.

By proving a hydraulic auxiliary uncoupling device having an adjustable accumulator piston and gearshift pistons cooperating therewith it is possible, to a great extent, to eliminate mechanical parts so that the driving device, according to the invention, can be produced and assembled economically.

To prevent the control pressure of the gear of the vehicle from acting upon the hydraulic auxiliary uncoupling device, an automatic sealing is effected when actuating the hydraulic auxiliary uncoupling device so as to ensure a reliable and perfect function of the driving device.

The seals here can be provided directly upon the gearshift pistons.

It can be advantageously provided that the auxiliary uncoupling device be equipped with a sealed oil volume which, during normal operation of the vehicle, is kept pressureless.

Since the auxiliary uncoupling device constitutes a self-contained hydraulically regarded system, the hydraulic parts needed for the auxiliary uncoupling device can be dimensioned, as needed, for actuating the auxiliary uncoupling device, that is, over-dimensions of the individual parts can be eliminated and thus the auxiliary uncoupling device can be produced at reasonable cost.

Since the auxiliary uncoupling device is kept pressureless during the normal operation of the vehicle, the necessary hydraulic parts can be made small in relation to the other parts of the transmission.

To prevent oil from leaking into the control pressure lines of the transmission, in case of buildup of pressure in the sealed circuit, the oil volume of the auxiliary uncoupling device can be separated by seals from the control pressure lines of the transmission.

By providing such seals, it is prevented that oil from the sealed oil volume penetrates into the control pressure lines, and that the oil volume within the auxiliary uncoupling device thus diminishes, which eventually can lead to a breakdown of the auxiliary uncoupling device.

The seals additionally prevent that oil from the control lines of the transmission, which are under high pressure, flows into the sealed oil volume and that thus the auxiliary coupling device is unintendedly actuated.

The driver of the vehicle could not prevent such an unintended actuation and thus this can contribute to a driving situation conducive to accidents.

To provide a simple actuation of the driving device, the accumulator piston can be manually actuatable.

No additional devices or drives are thus required for actuating the auxiliary uncoupling device, and the auxiliary uncoupling device can be simply and easily actuated at any time by any body when needed.

The manual actuation of the accumulator piston can, at the same time, be provided so that the accumulator piston is axially movable over a thread.

Since a thread can be designed in a manner such that when rotating the thread or the bolt self-locking occurs, it is thus possible, in a simple and an inexpensive manner, to provide actuation of the accumulator piston with a small consumption of energy.

To order to rule out any faulty actuation of the auxiliary uncoupling device by the operator, the accumulator piston can be provided with path limiting means.

To provide such path limiting means ensures that the oil pressure produced within the auxiliary uncoupling device, by the accumulator piston or by the movement thereof, will not increase excessively which could eventually result in damages to the auxiliary uncoupling device.

An easy operation of the accumulator piston can be obtained by providing the accumulator piston with an hexagon head or an hexagonal recess.

Tools of a known type, such as hollow keys or fork wrenches, can be fastened to an hexagon head, a lever arm is also obtained, due to the length of the tool, so that the operator of the auxiliary uncoupling device may actuate the auxiliary uncoupling device with relatively little consumption of energy.

If no adequate tool such as a hollow key or fork wrench is available, the hexagon head can also be embraced and actuated with suitable pliers.

After the horizontally lying vehicle has been towed, the auxiliary uncoupling device is reset to its initial position.

This can also be advantageously done by providing the gearshift pistons with spring mechanisms which force the gearshift piston back to its initial or normal position.

By providing spring mechanisms in the gearshift pistons, it is ensured that the auxiliary uncoupling device is easily completely reset to its initial position.

To make it possible to design the whole driving device as compact as possible, the auxiliary uncoupling device can be integrated into a transmission block.

Additional connecting lines between construction elements of the drive, spatially separated from each other, thereby become unnecessary since said connecting lines can already be provided in the transmission block. A bothersome hose connection can thus be eliminated when assembling the driving device.

In an advantageous embodiment of the invention, a compensating cylinder can be provided which comprises a compensating piston prestressed with a spring mechanism and which is related to the volume of the accumulator piston.

By providing a compensating cylinder with a spring mechanism, it can be ensured that in the hydraulic system a uniform pressure always prevails in the auxiliary uncoupling device so that, for example, changes of pressure resulting from fluctuations in temperature, which produce an increase or a decrease in the constant oil volume, can be always compensated without problems.

If the temperature rises, that is, the oil expands, the differential volume of the oil in the compensating cylinder flows out and the compensating piston is moved against the force of the spring mechanism.

If the temperature again drops, then the differential volume is again supplied to the sealed system by the spring mechanism.

BRIEF DESCRIPTION OF THE DRAWING

An embodiment of this invention is fundamentally shown below with the aid of the drawings in which.

DESCRIPTION OF THE PREFERRED EMBODIMENTS

Figure 1:
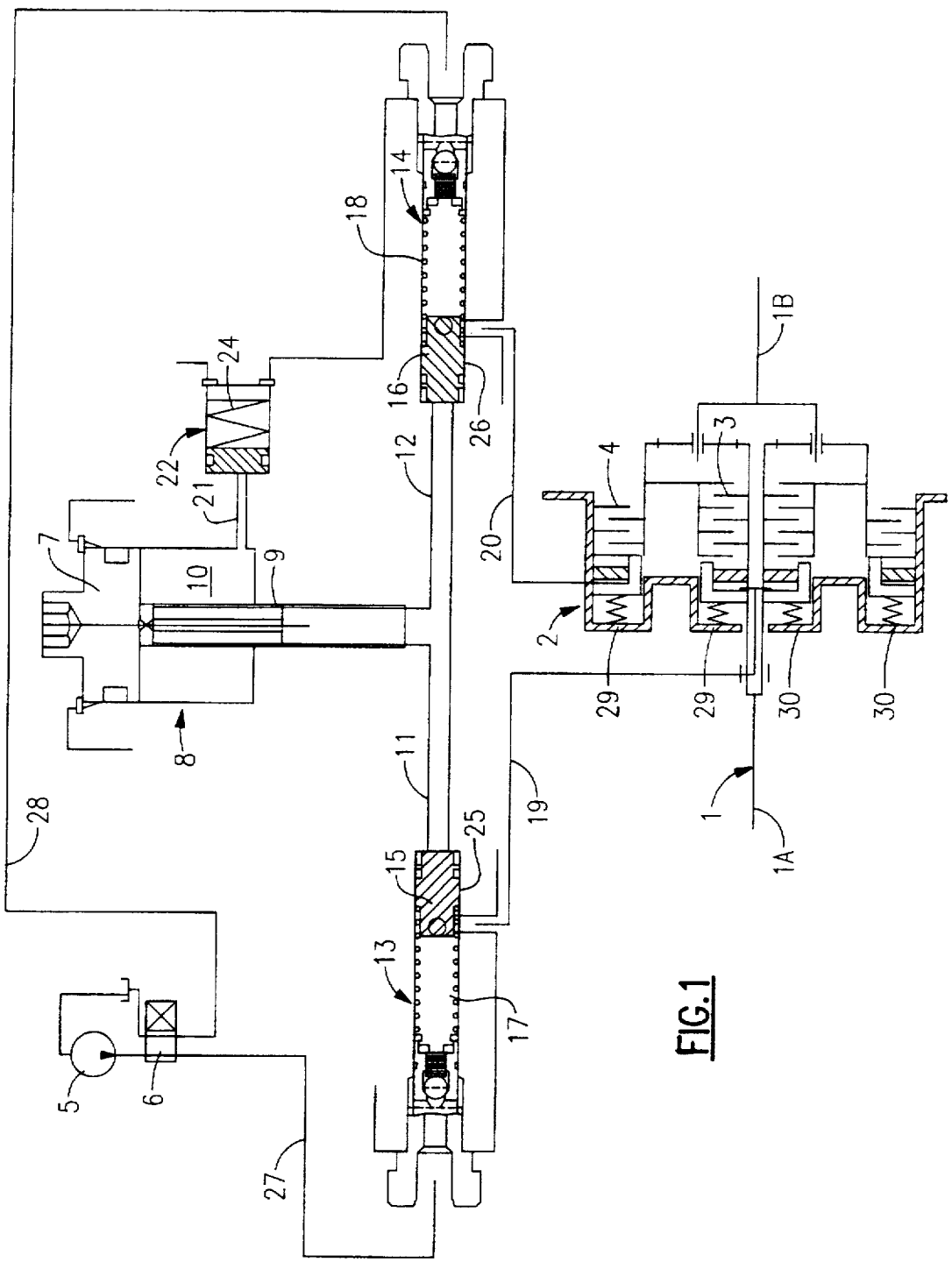
FIG. 1 diagrammatically shows the construction of the auxiliary uncoupling device in an unactuated state.

Referring to FIG. 1, the construction of an auxiliary uncoupling device is fundamentally shown.

The power train 1, with an input side 1A and an output side 1B, is uncoupled, in a manner known per se, as by means of a hydraulically actuated device.

The clutch device 2 of the vehicle essentially has a friction clutch 3 and a friction brake 4.

Even though herebelow mention is repeatedly made of the friction clutch 3 and the friction brake 4, the friction brake 4 does not perform the actual function of a brake but rather also constitutes a clutch. Since the outer discs in the friction brake 4 are firmly disposed within the clutch housing, it is designated as friction brake 4 for better differentiation. Contrary to this, both the inner and outer discs can rotate in the friction clutch 3.

A pump 5 is provided to supply the whole system with hydraulic fluid, the coupling and uncoupling of the clutch device 2 is controllable by a solenoid valve 6.

The solenoid valve 6 is connected here in a manner such that in case of failure of the pump 5, or quite generally in the case of a pressure drop within the pipeline system, the clutch becomes automatically engaged.

It is thus not possible to tow the vehicle, it being on the contrary an uncoupling of the power train that is needed for this.

The power train is uncoupled by actuating an accumulator piston 7 in an accumulator cylinder 8.

The accumulator piston 7 can be actuated by attaching an adequate tool, such as a hexagon head or hexagonal recess to an adequately shaped part of the accumulator piston 7, so that the accumulator piston 7 can be manually actuated.

In the instant embodiment, the accumulator piston 7 is guided by a thread 9 so that when torque acts upon the accumulator piston 7 the latter is axially moved.

Hereby the volume 10 of the accumulator cylinder 8 diminishes and the oil therein is forced, via pipes 11, 12 in two gearshift valves 13, 14 during which process gearshift pistons 15, 16 situated in the gearshift valves 13, 14 are actuated by the inflowing oil and moved against the tension of a spring mechanism which is designed as compression springs 17, 18.

The volume 10 of the accumulator cylinder 8 is here reduced to an extent such that the gearshift pistons 15, 16 are moved within the gearshift valves 13, 14 far enough to communicate with opening of the lines 19, 20 branching off the gearshift valves 13, 14.

If the openings of the lines 19, 20 within the gearshift valves 13, 14 are free, a direct hydraulic connection exists between the volume 10 of the accumulator cylinder 8 and the clutch device 2.

If the accumulator piston 7 is now rotated farther along the thread 9, then the volume 10 of the accumulator cylinder 8 diminishes more. The amount of oil removed here can now flow directly via the lines 11, 12 through the gearshift valves 13, 14 and via the lines 19, 20 into the clutch device 2 and thereby uncouple the power train.

In this embodiment, it is provided that the friction clutch 3 is disengaged by the gearshift valve 13 and the friction brake 4 by the gearshift valve 14. This disengagement takes place against the resistance of compression springs 29, 30 in the clutch device 2.

In order that not too high a pressure generates within the hydraulic circuit due to an excessively extensive reduction of the volume 10 of the accumulator cylinder 8, that is, due to too great an amount of oil removed from the volume 10, the accumulator piston 10 is provided with path limiting means.

The accumulator cylinder 8 is connected by a connecting line 21 with a compensating cylinder 22 which comprises a compensating piston 23 kept in a prestressed state by a spring mechanism designed, in this embodiment, as compression spring 24.

The task of the compensating cylinder 22 is to take care, in case of temperature fluctuations, that the oil volume present in the sealed circuit is constant so as to prevent an erroneous actuation of the gearshift pistons 15, 16, especially at elevated temperatures, that is, when the oil volume present in the sealed circuit expands.

Seals 25, 26 are additionally provided in the gearshift valves 13, 14 which prevent oil from the sealed circuit from penetrating into the control pressure lines 27, 28.

Figure 2:
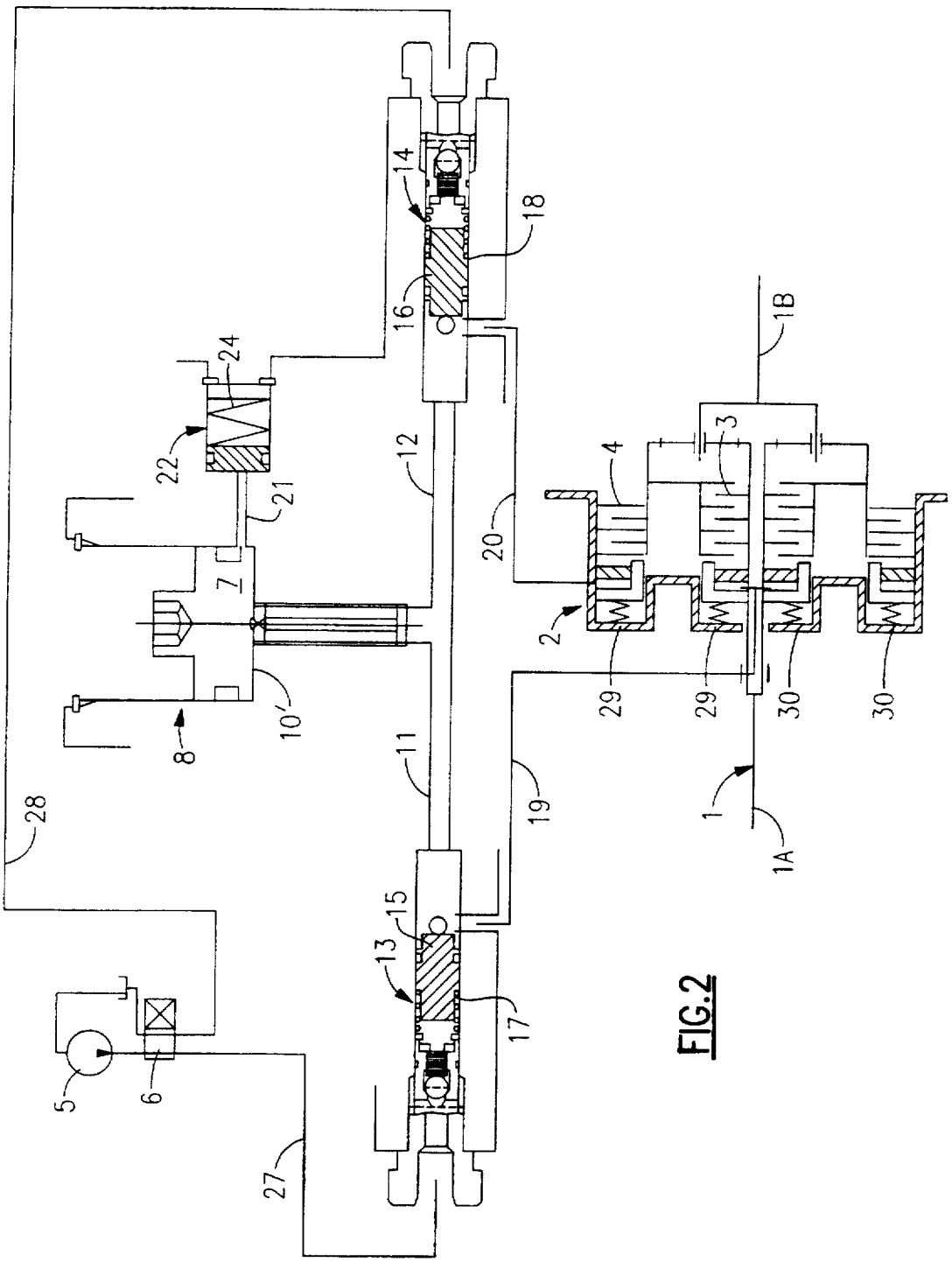
FIG. 2 diagrammatically shows the construction of the auxiliary uncoupling device in an actuated state.

FIG. 2 shows the described hydraulic system in the actuated state. The accumulator piston 7 in the accumulator cylinder 8 is here screwed as far as possible along the thread 9. Further axial movement is prevented by the already mentioned path limiting means.

The volume 10 has diminished to a new volume 10', the oil forced out from the volume 10 has moved the gearshift pistons 15, 16 into the gearshift valves 13, 14 so that the oil could flow via the lines 19, 20 into the clutch device 2, and the compression springs 29, 30 are compressed in the clutch device 2.

If normal driving operation is resumed, then it is obviously necessary again to cancel uncoupling of the power train 1.

For this purpose, the accumulator piston 7 is again screwed back to its original position. Hereby the volume 10 in the accumulator cylinder 8 again increases. The oil can thus flow back into volume 10 and the friction clutch 3 and the friction brake 4 are again engaged. This flowing back results from the relaxation of the prestressed compression springs 29, 30 in the clutch device 2, which always effect an automatic engagement of the clutch device 2 in case the oil pressure within the sealed hydraulic circuit should drop, that is, also in case of leakage in the hydraulic circuit, for example.

The prestressed compression springs 17, 18 in the gearshift valves 13, 14 here move the gearshift pistons 15, 16 likewise again to their original position so that the oil volume present in the gearshift valves 13, 14 flows again into the accumulator cylinder 8.

The described sealed oil circuit is filled one time with durable oil and vented. If the auxiliary uncoupling device is not actuated, then all the seals within the circuit are subject only to static load and accordingly have no wear.

Since as already described, upon an actuation of the auxiliary uncoupling device both the friction clutch 3 and the friction brake 4 are disengaged, also no power transmission can result in case of an unintended actuation of the drive so that the vehicle cannot be unintentionally moved.

Modified known throttle pressure-relief valves are used as gearshift valves 13, 14, the hole of the restrictor and the housing of the throttle pressure-relief valve are correspondingly lengthened and the gearshift pistons 15, 16 are provided at the other end of the throttle pressure-relief valve. Compression springs 171 18 are provided therebetween which take care that after the oil volume has been forced back from the lines 19, 20, the oil is forced via the lines 11, 12 into the volume 10.

| Referenced numerals | |
|---|---|
| 1 power train | 16 gearshift piston |
| 2 clutch device | 17 compression spring |
| 3 friction clutch | 18 compression spring |
| 4 friction brake | 19 line |
| 5 pump | 20 line |
| 6 solenoid valve | 21 connecting line |
| 7 accumulator piston | 22 compensating cylinder |
| 8 accumulator cylinder | 23 compensating piston |
| 9 thread | 24 compression spring |
| 10 volume of the cylinder | 25 seal |
| 11 line | 26 seal |
| 12 line | 27 control pressure line |
| 13 gearshift valve | 28 control pressure line |
| 14 gearshift valve | 29 compression springs |
| 15 gearshift piston | 30 compression springs |

We claim:

1. A two-speed transmission, having two friction clutches (3, 4) with friction elements which are engaged by spring tension and disengaged by oil pressure, said two friction clutches (3, 4) having clutch lines (19, 20 and 27, 28) which lead to pressure chambers which are switched via gearshift valves (13, 14), and said two friction clutches, in an engaged state, acting as a parking brake;

wherein said gearshift valves have gearshift pistons (15, 16) which are connected by accumulator lines (11, 12) with an auxiliary uncoupling device which has an adjustable accumulator piston (7), and, upon the actuation of said adjustable accumulator piston (7), said gearshift pistons are moved so that said clutch lines (19, 20) are connected with said accumulator lines (11, 12) such that an oil volume accumulated within said auxiliary uncoupling device is supplied from said accumulator pistons (7) to said two friction clutches (3, 4) to uncouple said two friction clutches (3, 4); and said auxiliary uncoupling device is provided with a sealed oil volume which is maintained pressureless during normal operation of the vehicle.

2. A driving device according to claim 1, wherein the oil volume of said auxiliary uncoupling device is separated, by seals (25, 26) from control pressure ad lines (27, 28) of said gearshift valves (13, 14).

3. A driving device according to claim 2, wherein said seals (25, 26) are provided on said gearshift pistons (15, 16).

4. A driving device according to claim 1, wherein said accumulator piston (7) is manually actuated.

5. A driving device according to claim 4, wherein said accumulator piston (7) is axially moveable along a threaded member (9) to actuate of said adjustable accumulator piston (7).

6. A driving device according to claim 5, wherein said accumulator piston (7) is provided with one of a hexagon head and a hexagonal recess to facilitate rotation thereof and actuation of said adjustable accumulator piston (7).

7. A driving device according to claim 1, wherein said accumulator piston (7) is provided with path limiting means.

8. A driving device according to claim 1, wherein each of said gearshift pistons (15, 16) is provided with a spring mechanism (17, 18) which forces said gearshift pistons (15, 16) into a normal position.

9. A driving device according to claim 1, wherein said auxiliary uncoupling device is integrated into a gear block.

10. A driving device according to claim 1, wherein a compensating cylinder (22) is provided which comprises a compensating piston (23) which is prestressed by a spring mechanism (24) and communicates with the volume of said accumulator piston (7).

11. A two-speed transmission, having two friction clutches (3, 4) with friction elements being engagable by spring tension and being disengagable by oil pressure, said two friction clutches (3, 4) having clutch lines (19, 20 and 27, 28) which lead to pressure chambers which are switched via gearshift valves (13, 14), and said two friction clutches, when in an engaged state, acting as a parking brake of said two-speed transmission;

wherein said gearshift valves have gearshift pistons (15, 16) which are connected with an auxiliary uncoupling device, via accumulator lines (11, 12), which has an adjustable accumulator piston (7), and, upon the actuation of said adjustable accumulator piston (7), said gearshift pistons are moved so that said clutch lines (19, 20) are connected with said accumulator lines (11, 12) so that a volume of oil, which has accumulated within said auxiliary uncoupling device, is supplied from said accumulator piston (7) to said two friction clutches (3, 4) to uncouple said two friction clutches (3, 4); and said auxiliary uncoupling device is provided with a sealed oil volume which is maintained at a substantially constant pressure during normal operation of the vehicle.

* * * * *